March 31, 1953 R. RIETH 2,633,545

VARIABLE-SPEED DRIVE

Filed April 11, 1952

Rene Rieth
INVENTOR.

BY *Clarence A. O'Brien
and Harvey B. Jacobson*
Attorneys

Patented Mar. 31, 1953

2,633,545

UNITED STATES PATENT OFFICE 2,633,545

VARIABLE-SPEED DRIVE

René Rieth, Ettelbruck, Luxembourg

Application April 11, 1952, Serial No. 281,937

5 Claims. (Cl. 310—102)

This invention relates to a variable speed drive and particularly to a variable speed drive utilizing a pair of homopolar machines as the driving units.

It has long been desirable to have a variable speed coupling in which the speed ratios of the driving to driven members could be readily changed or in which the relative directions of rotation could be changed at will. Heretofore such couplings have been extremely difficult to construct and operate.

The present invention provides a variable speed coupling which may be readily varied over a wide range of speed ratios or even reversed without any difficulty. This is accomplished by means of a pair of homopolar machines in which the generator element is driven at any suitable speed, preferably a constant speed while the homopolar motor is directly coupled to the output of the generator and the coupling being varied as is desired.

The homopolar machines as is well known have a relatively low voltage but are capable of high current which may be readily controlled over a wide range. According to the present invention, the homopolar machine comprises a spool-like core having a winding to produce a polarizing effect thereon and means for controlling the strength of current on the windings so that the strength of current produced by the generator can be readily varied. Likewise, the motor comprises a disk which is in complete electrical contact with the generator disk and rotates about a pole, the polarity of which as well as the strength of which may be readily controlled.

It is accordingly an object of this invention to provide a variable speed coupling.

It is a further object of this invention to provide a coupling that can be controlled in speed ratio or speed direction.

It is a still further object of this invention to provide a coupling utilizing a pair of homopolar machines directly coupled together.

Other objects and many of the attendant advantages of this invention will be readily apparent from the following detailed description, taken in conjunction with the accompanying drawing, in which.

Figure 1:
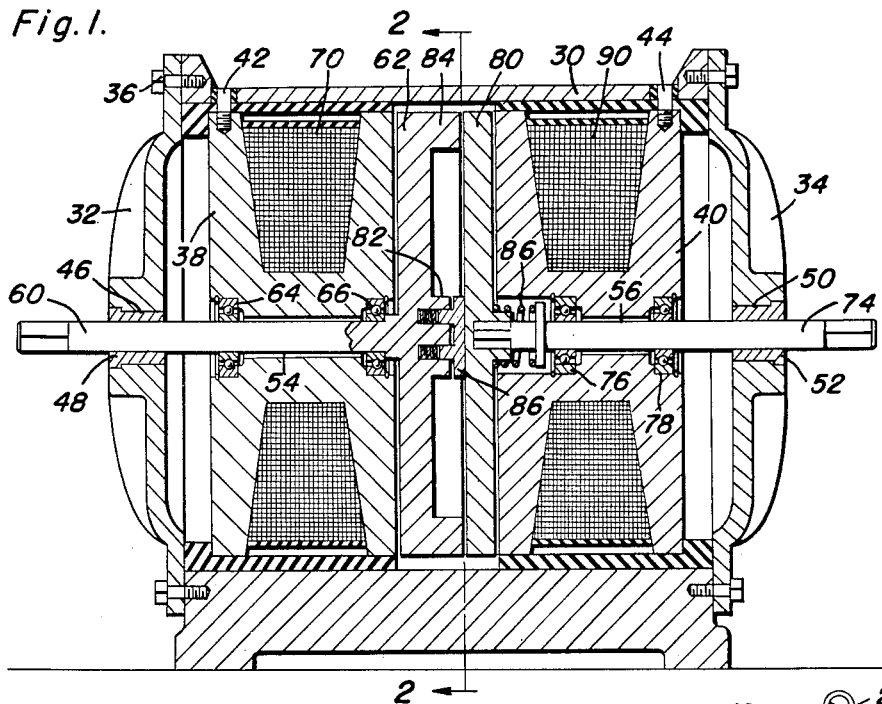
Figure 1 is sectional elevation of the homopolar coupling according to the invention.
Figure 2:
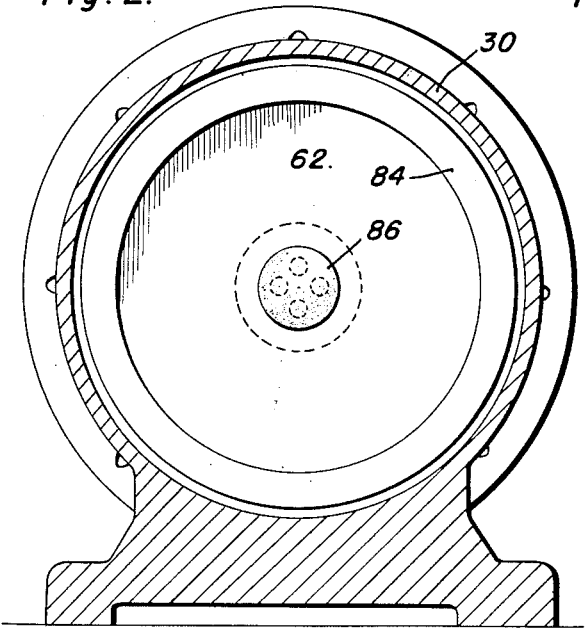
Figure 2 is a cross section of the machine, taken substantially on the plane indicated by the line 2—2 of Figure 1 and showing an improved generator disk.
Figure 3:
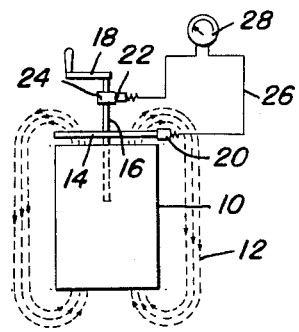
Figure 3 is a schematic diagram showing the well known homopolar demonstration.
Figure 4:
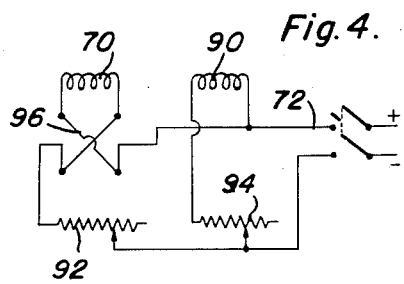
Figure 4 is a schematic wiring diagram of the variable speed coupling according to the invention.

Referring now to the drawings and particularly to Figure 3 thereof, which discloses the well known homopolar experiment 10 is a core of magnetic material having means for inducing flux 12 axially thereof. A disk 14 of conducting material is mounted on a shaft 16 which is journaled in the core member 10 so that the disk 14 is adjacent the face of the core 10 so that the flux 12 of the core 10 must cut the disk 14. The shaft 16 is provided with a crank 18 so that the disk 14 may be rotated in the flux. A collector 20 is arranged in contact with the edge of the disk while a collector 22 is associated with a collar 24 on the shaft 16 which is electrically connected to the central portion of the disk 14. A conductor 26 including a current sensitive instrument 28 is connected between the collectors 20 and 22. When the crank 18 is turned to rotate the disk 14, a voltage will be found to be generated in the disk 14 and to flow from the edge to the center thereof.

This well known but heretofore substantially useless experiment is utilized to provide the coupling of the present invention.

The coupling of the present invention provides a frame 30 having end bells 32 and 34 connected thereto, preferably the end bells 32 and 34 are connected to the frame 30 by means of suitable screw fasteners 36. A pair of spool-like magnetic cores 38 and 40 are mounted in the frame 30 and secured against rotation therein by any suitable means such as the screw fasteners 42 and 44. The end bell 32 is provided with an axial opening 46 in which is placed a bearing sleeve 48. Likewise, the end bell 38 is provided with an aperture 50 in which is placed a bearing sleeve 52. The core member 38 is provided with an axial bore 54 and the core member 40 is provided with an axial bore 56. The bushings 48, 52 and the bores 54 and 56 define a substantially axial passage through the structure including the core and the end bells.

A shaft 60 is mounted in the bearing bushing 48 and extends through the axial aperture 54 and has secured thereto in non-rotatable relation therewith a generator disk 62. Preferably bearings 64 and 66 are provided between the shaft 60 and the core member 38. The generator disk is mounted in proximity to the end surface of the core 38 and the core 38 is provided with a winding 70 which is energized by suitable DC circuit 72 to produce a flow of flux in the core 38. The shaft 60 is rotated by any suitable power source (not shown), so that the disk 62 is rotated in the flux produced by the core 38.

A core 40 having end bell 34 is provided with a shaft 74 having bearings 76 and 78 in the core member 40 and having secured thereto in non-rotatable rotation therewith a disk 80 of conducting material. One of the disks such as the disk 62 is provided with a central projection 82 and a peripheral projection 84. One of the disks such as the disk 80 is slightly adjustable longitudinally of its shaft such as the shaft 74 and preferably is provided with resilient means such as the spring 86 for forcing the disks 62 and 80 into firm electrical contact. If desired, to assist in maintaining the electrical contact, a brush-like or transfer member 88 may be interposed between the disks at the central portion thereof while the peripheries will be maintained in firm electrical contact with each other. The core 40 will be provided with a winding 90 which will likewise be energized from the circuit 72. Preferably the windings 70 and 90 will be provided with suitable current control devices such as the impedances 92 and 94. Also means such as the double pole double throw switch 96 will be provided for reversing the current flow through one of the windings, such as the winding 70.

In the operation of the device according to the construction, one of the shafts such as the shaft 60 will be driven from any suitable source (not shown), so that the disk 62 will be rotated in proximity to the face of the core 38. The winding 70 will be energized from the circuit 72 to produce a flux in the core which is cut by the disk 62 to generate a potential therein. The disk 80 being in electrical contact with the central portion and the peripheral portion of the disk 62 substantially short circuits the voltage generated in the disk 62 so that a circulating current will flow through the disk 62, the rim 84, the disk 80 and the central contact 82. This current flow will be substantially radial from the center to the periphery and will be substantially uniform through the area of the disk. The winding 90 will be energized from the circuit 72 and will establish a flux in the core 40 which cuts the disk 80 and as current is flowing in the disk 80 there will be the well known reaction between the current in the disk 80 and the flux in the core 40, so that the disk 80 will rotate with respect to the core 40. The direction of rotation of the disk 80 being entirely dependent on the polarity of the cores 38 and 40. A reversal of polarity of either one of the cores will result in the reversal of the direction of rotation of the disk 80. The shaft 74 being non-rotatably connected to the disk 80 will likewise rotate therewith so that any suitable machine or other device may be driven thereby. The speed ratio of the disks 62 and 80 may be readily adjusted by adjusting the relative strength of the windings 70 and 90. This relative strength of the fields produced by the windings 70 and 90 may be readily controlled by the impedances 92 and 94. With the impedances 92 and 94 at a minimum, maximum current will flow in the windings 70 and 90 and minimum slip will occur between the disks 62 and 80. By "slip" is meant the relative difference of speed between the disks 62 and 80 regardless of the direction of rotation of the disks 62 and 80. Weakening of the field of the generator will necessarily reduce the current produced in the disk 62 and increase the slip between the disk 62 and the disk 80. Likewise reducing the current in the field 90 will reduce the flux in the core 40 and increase the slip ratio between the disks 62 and 80. Thus by controlling a polarity of one or both of the fields and strength of one or both of the fields, any desired direction of rotation may be obtained as well as any desired speed ratio.

While a preferred embodiment has been shown and described according to the best present understanding thereof, it will be understood that many changes and modifications can be made therein without departing from the true spirit of the invention as claimed.

Having described the invention, what is claimed as new is:

1. A variable speed transmission comprising a first shaft, a first disk fixed on said shaft, a magnet core coaxial with said first shaft, a winding on said core, a second shaft, a second disk non-rotatably mounted on said second shaft, said second disk having central and peripheral contact with said first disk, a second magnetic core coaxial with said second shaft, a winding on said second magnetic core, circuits for energizing said windings, resilient means maintaining said second disk in electrical contact with said first disk.

2. A variable speed transmission comprising a frame, a pair of spaced apart magnet cores mounted in said frame, a pair of shafts in axial alignment, each of said shafts extending through one of said magnet cores, conducting disks mounted on the meeting ends of said shafts, windings on said cores, circuits for energizing said windings, said windings producing flux in said cores, said disks being in electrical contact at the peripheries and at the central portion, one of said disks being non-rotatably secured on the associated shaft, said disk being mounted for limited longitudinal movement along said shaft.

3. A variable speed transmission comprising a frame, end bells on said frame, a pair of spaced apart core members mounted in said frame, an axial passage extending through said end bells and said core members, a first shaft extending through one end bell and the adjacent core member, a second shaft extending through the other end bell and the other core members, bearing members between each of said shafts and the respective core members, an electrically conducting disk non-rotatably mounted on each of said shafts, said disks being an electrical contact adjacent the center and adjacent the peripheries, said central contact including a spring pressed transfer member, a winding on each of said cores, circuit means for energizing said windings, and a current controlling device connected in series with one of said windings.

4. A variable speed transmission comprising a frame, end bells on said frame, a pair of spaced apart core members mounted in said frame, an axial passage extending through said end bells and said core members, a first shaft extending through one end bell and the adjacent core member, a second shaft extending through the other end bell and the other core members, bearing members between each of said shafts and the respective core members, an electrically conducting disk non-rotatably mounted on each of said shafts, said disks being in electrical contact adjacent the center and adjacent the peripheries, a winding on each of said cores, circuit means for energizing said windings, and a reversing switch connected between said circuit and one of said windings.

5. A variable speed transmission comprising a frame, end bells on said frame, a pair of spaced apart core members mounted in said frame, an axial passage extending through said end bells and said core members, a first shaft extending through one end bell and the adjacent core member, a second shaft extending through the other end bell and the other core members, bearing members between each of said shafts and the respective core members, an electrically conducting disk non-rotatably mounted on each of said shafts, said disks being in electrical contact adjacent the center and adjacent the peripheries, a winding on each of said cores, circuit means for energizing said windings, one of said disks having limited axial motion along its associated shaft, and resilient means urging said disks into firm contact.

RENÉ RIETH.

REFERENCES CITED

The following references are of record in the file of this patent:

UNITED STATES PATENTS

| Number | Name | Date |
|---|---|---|
| 339,839 | Batchelor | Apr. 13, 1886 |
| 645,943 | Dalen | Mar. 27, 1900 |
| 1,987,479 | Japolsky | Jan. 8, 1935 |
| 2,408,080 | Lloyd | Sept. 24, 1946 |

FOREIGN PATENTS

| Number | Country | Date |
|---|---|---|
| 141,360 | Great Britain | July 7, 1921 |